United States Patent Office 2,974,318
Patented Mar. 7, 1961

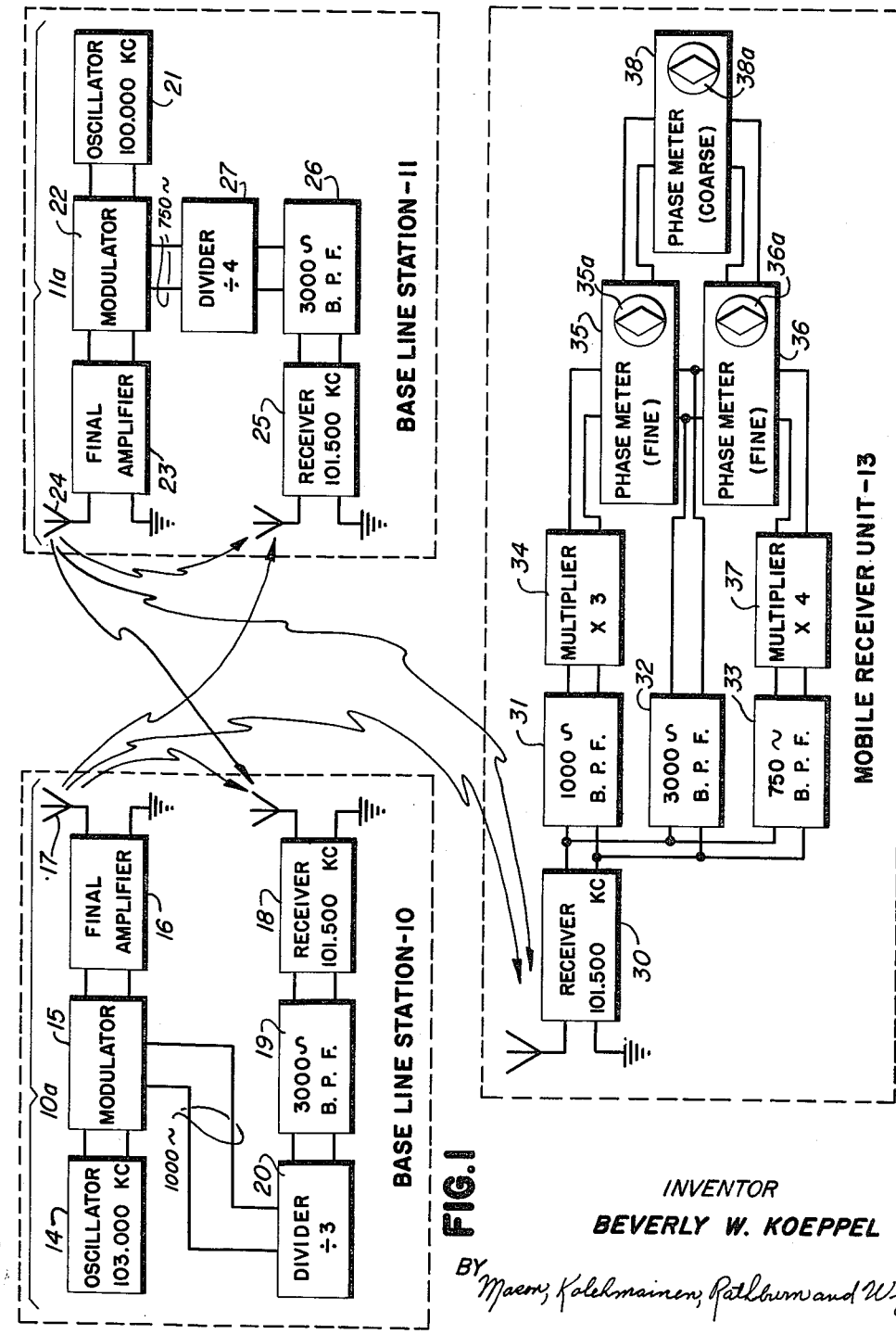
INVENTOR
BEVERLY W. KOEPPEL
ATTORNEYS

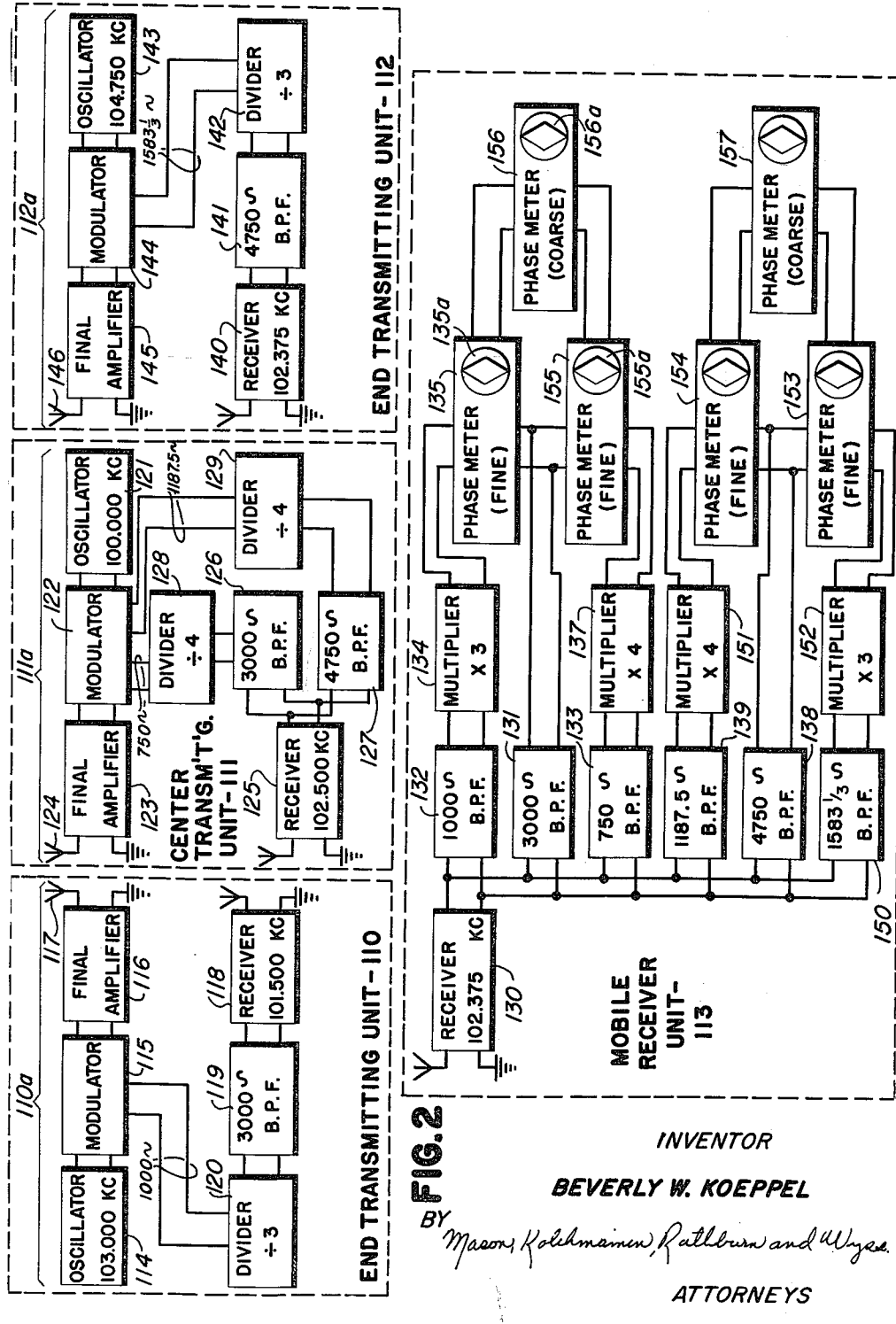

2,974,318

RADIO LOCATION SYSTEM

Beverly W. Koeppel, Tulsa, Okla., assignor to Seismograph Service Corporation, Tulsa, Okla., a corporation of Delaware Filed Oct. 16, 1956, Ser. No. 616,332

15 Claims. (Cl. 343—105)

The present invention relates to radio location and distance determining systems and, although not limited thereto, relates more particularly to improvements in radio position finding systems of the hyperbolic, continuous wave type employing phase comparison in pairs of position indication signals radiated from a plurality of spaced transmitting points to provide one or more indications from which the position of a mobile receiving point relative to the known positions of the transmitting points may be determined without ambiguity and with precision accuracy.

In systems of the particular type referred to, the continuous waves radiated from each pair of transmitters bear a phase relationship which changes as a function of changing position between the two transmitting points. More specifically, the waves radiated from each pair of transmitting units of the system are characterized by isophase lines which are hyperbolic in contour about the transmitting points as foci. On a line joining the pair of transmitters, these isophase lines are spaced apart a distance equal to one half of the wave length of one of radiated waves, and have diverging spacings at points on either side of this line. With this system arrangement, the position of a receiving point relative to a pair of hyperbolic isophase lines may be determined by measuring the phase relationship between continuous waves radiated from the pair of transmitters.

Since the point of location of the receiving point along the zone separating the two isophase lines is not indicated by such a phase measurement, it is desirable to employ at least three spaced transmitters, different pairs of which function to provide a grid-like pattern of intersecting hyperbolic lines, in order to obtain absolute determination of the position of the receiving point. Systems of the character described are exceedingly accurate in so far as the position indications produced at the receiving point are concerned. For the system to function, however, it is necessary to maintain phase synchronization between the continuous waves radiated by the spaced transmitters, or, alternatively, so to arrange the system that phase shifts between the radiated waves are compensated during the phase comparing operation. Phase synchronization of the waves radiated from the plurality of transmitters presents an exceedingly difficult problem which has been the subject of considerable development work.

To obviate this problem, systems of the continuous wave hyperbolic type have been proposed (see Honore, United States Patent No. 2,148,267) in which the phase shift problem is obviated by heterodyning the carrier waves of each pair of baseline transmitters at a fixed link transmitting point, and modulating the difference frequency component of the heterodyned waves as a reference signal upon the carrier output of the link transmitter for radiation to the receiving point, where the difference frequency component is detected and phase compared with a difference frequency signal derived by directly heterodyning the transmitted continuous waves at the receiving point. In this manner, phase shifts between the continuous waves radiated from the two transmitters are completely compensated so that the measured phase angle is truly representative of the location of the receiving point between a pair of isophase lines. However, in these systems, the location of the link transmitting station at a point remote from the baseline transmitters introduces an error into the phase meter reading at the receiving point, which error has come to be known as a "third frequency error." A complete discussion of the cause and relative magnitude of the latter error is found in copending application Serial No. 616,215, now U.S. Patent No. 2,871,474, of the present inventor filed simultaneously herewith.

While the described arrangement for obviating the phase synchronization problem is entirely satisfactory, another problem encountered in the operation of continuous wave systems is that of eliminating ambiguity from the phase measurements which provide the desired position information. Thus, while the two phase measurements identify the position of the receiving station relative to two intersecting pairs of hyperbolic isophase lines, they do not identify the pairs of lines to which the indications are related. This means that in operating the system the geographic location of the receiving system must be known at the start of movement of the receiving system relative to the transmitting stations, and, furthermore, that the successive wave lengths must be counted as the receiving station is moved relative to the grid-like pattern of hyperbolic lines. It also means that a mobile craft entering the radiation pattern of the transmitters cannot utilize the radiated signals to determine its position without employing auxiliary equipment to determine the approximate position of the craft relative to the signal transmitters.

It is another object of the present invention to provide an improved radio location system of the continuous wave type which is free of phase synchronization difficulties of the character mentioned and in which the above-mention disadvantages pertaining to ambiguity are entirely obviated.

It is another objects of the present invention to provide an improved radio location system of the continuous wave type which is free of phase synchronization difficulties and in which certain of the position indications obtained have sensitivities, in so far as the spacing of the isophase lines is concerned, which will be referred to hereinafter as phase sensitivity, different from the phase sensitivity normally determined by the frequencies of the radiated waves.

It is a further object of the present invention to provide a radio position finding system of the character described in which non-ambiguous position indications are obtained while employing a minimum amount of transmitting and receiving equipment.

It is a still further object of the invention to provide a radio position finding system of the character described in which a plurality of low phase sensitivity position indications and high phase sensitivity position indications are obtained, the low phase sensitivity indications being effective to locate the range of the high phase sensitivity indications and being characterized by widely spaced phase coincidences, and the high phase sensitivity indications being characterized by closely spaced phase coincidences.

Still another object of the invention is to provide a radio position indicating system of the character described wherein such high phase sensitivity and low phase sensitivity position indications are obtained while employing a minimum number of channels within the frequency band suitable for efficient long range propagation.

A further object of the invention is to provide a radio position finding system of the type described above in which the position indications are free from third frequency error.

It is likewise an object of the present invention to provide improved transmission systems for use in radio location systems of the above indicated character.

It is also an object of the invention to provide improved receiving equipment for use in radio location systems of the above-indicated character.

The invention, both as to its organization and method of operation, together with further objects and advantages thereof, will best be understood by reference to the specification taken in connection with the accompanying drawings, in which:

Fig. 1 is a diagrammatic representation of a simple two-foci position indicating system embodying the invention; and, Fig. 2 is a diagrammatic representation of a three-foci position indicating system embodying the present invention for simultaneously providing position indications of high and low phase sensitivity.

Referring now to the drawings, and particularly to Fig. 1 thereof, the invention is illustrated as embodied in a two-foci, hyperbolic, continuous wave system for providing position information at any number of mobile receiver units 13, which may be carried upon vessels or vehicles operating within the radius of transmission of a pair of spaced position signal transmitting units or base line stations 10 and 11. Arrow-pointed lines extending from the various transmitters to the various receivers have been employed to indicate the particular carrier waves radiated by the transmitters and their points of reception. As described more fully hereinafter, the transmitting units 10 and 11 are equipped with a pair of transmitters 10a and 11a for continuously radiating position indicating carrier waves at frequencies which differ from each other by a small audio frequency. As indicated in Fig. 1, the output frequencies of the transmitters 10a and 11a may be 103.000 kilocycles and 100.000 kilocycles, respectively, such that the difference or beat frequency therebetween is 3,000 cycles and, as a result, both of these signals fall well within a 10 kilocycle band or single frequency channel allocated by the Federal Communications Commission of the U.S. Government.

The equipment comprising the transmitter 10a at the base line station 10 includes an oscillator or signal generator 14 developing a carrier wave signal having a frequency of 103.000 kilocycles, a modulator 15 and a final amplifier 16 for amplifying the signal output of the modulator and applying the same to an emitting antenna 17. The equipment at the base line station 10 further includes a reference receiver 18 center tuned to a frequency of 101.500 kilocycles for receiving the signals radiated by each of the transmitters 10a and 11a and for heterodyning these signals to produce the 3,000 cycle beat frequency therebetween. The latter beat frequency signal is applied through a 3,000 cycle band pass filter 19 to a divider circuit 20. The latter circuit functions to divide the 3,000 cycle output from the band pass filter by a factor of three to produce a 1,000 cycle signal for application to the modulator 15, with the result that the signal radiated by the transmitter 10a is continuously modulated with a 1,000 cycle signal. The band pass filter 19, of course, rejects all of the signals developed by the receiver 18 except the desired 3,000 cycle beat frequency. Thus, the beat frequencies between the side bands of the signals radiated by the transmitters 10a and 11a are all rejected by the filter 19, together with the modulation component appearing on the signal received from transmitter 11a as described more fully below.

The transmitter 11a at the base line station 11 comprises an oscillator or signal generator 21 developing a radio frequency carrier wave signal of 100.000 kilocycles, a modulator 22 and a final amplifier 23 through which the signals from the modulator are applied to an emitting antenna 24. The equipment provided at the base line station 11 further comprises a receiver 25 center tuned to a frequency of 101.500 kilocycles for receiving the signals radiated from the transmitters 10a and 11a. The receiver 25 functions to heterodyne the two received signals in order to produce a 3,000 cycle beat frequency for application to the 3,000 cycle band pass filter 26. The receiver 25 also develops the 1,000 cycle signal modulated upon the carrier wave radiated by the transmitter 10a, as well as the difference frequencies between the side bands of the waves received from transmitters 10a and 11a, but all of these signals except the 3,000 cycle beat frequency are rejected by the filter 26. The divider circuit 27 divides the 3,000 cycle frequency passed by the filter 26 by a factor of four and produces a 750 cycle signal for application to the modulator 22. Thus, the carrier wave radiated by the transmitter 11a is continuously modulated with a 750 cycle audio frequency signal.

The modulated carrier wave signals radiated by the transmitters 10a and 11a are both accepted by a receiver 30 at the mobile receiver unit 13. This receiver, which is center tuned to a frequency of 101.500 kilocycles detects and reproduces the 1,000 cycle audio frequency signal modulated upon the carrier wave radiated by the transmitter 10a, together with the 750 cycle audio frequency signal modulated upon the carrier wave radiated by the transmitter 11a. The receiver 30 also functions to heterodyne in pairs the two received carrier waves and their side bands to produce the beat frequencies therebetween. All of the signals developed by the receiver 30 are simultaneously applied to the signal input terminals of a 1,000 cycle band pass filter 31, a 3,000 cycle band pass filter 32 and a 750 cycle band pass filter 33. The filters 31, 32 and 33 function to reject all of the developed signals except (a) the 1,000 cycle modulation signal appearing on the wave received from transmitter 10a, (b) the 750 cycle modulation signal appearing on the wave received from transmitter 11a and (c) the 3,000 cycle beat frequency resulting from heterodyning the two carrier waves radiated by transmitters 10a and 11a. The 1,000 cycle modulation signal is, of course, passed by the filter 31 to a multiplier 34, where it is multiplied by a factor of three to increase its frequency to 3,000 cycles. The output of the multiplier 34 is applied to one set of signal input terminals of a phase meter 35. The 3,000 cycle beat frequency signal developed by the receiver 30 as a result of heterodyning the carrier waves radiated from the transmitters 10a and 11a is passed by the filter 32 to a second set of signal input terminals of the phase meter 35 and to one set of signal input terminals of a phase meter 36. As will be understood by those skilled in this art, and particularly by reference to the aforementioned Honore Patent No. 2,148,267, the phase meter 35 measures the phase relationship between the two signals applied to its separate sets of input terminals and provides an indication representative of the location of the mobile receiver unit 13 relative to hyperbolic isophase lines having foci at the base line stations 10 and 11. Since these isophase lines, which define a fine lane, are spaced apart along a base line joining the points of location of the stations 10 and 11 by a distance corresponding to one half of the wave length of a 100.000 kilocycle signal, i.e., a distance of approximately 4,880 feet, it will be recognized that the reading provided by the phase meter 35 relates to relatively closely spaced hyperbolic lines, and, for this reason, may be termed a fine or high phase sensitivity position indication. This fine position indication is ambiguous in the sense that the particular isophase line passing through the receiver location is not identified.

The 750 cycle output from band pass filter 33 is applied to a multiplier 37, where it is multiplied by a factor of four to increase the frequency to 3,000 cycles. The output of the multiplier 37 is applied to the second set of signal input terminals of the phase meter 36. The phase meter 36 functions in the manner described above to measure the phase relationship between the two signals applied to its separate sets of input terminals and provides an indication representative of the location of the mobile receiver unit 13 relative to hyperbolic isophase lines having foci at the baseline stations 10 and 11. Since these isophase lines, which again define a fine lane, are spaced apart along a baseline joining the points of location of the stations 10 and 11 by a distance corresponding to one half of the wave length of a wave having a frequency of 103.000 kc., i.e., a distance of approximately 4,760 feet it will be recognized that the reading provided by the phase meter 36 also relates to relatively closely spaced hyperbolic lines, and for this reason may be termed a second fine or high phase sensitivity position indication.

In order to provide coarse or low phase sensitivity position indications, it is necessary to measure the difference of the outputs from the two phase meters 35 and 36. This difference measurement can be accomplished either electrically or mechanically. If performed mechanically, the rotor shafts carrying the indicating elements 35a and 36a of the phase meters 35 and 36, respectively, may be connected to drive the input gears of a conventional differential mechanism the output shaft of which drives the indicating element 38a of a phase meter 38. If the difference measurement is made electrically the phase of the beat frequency between the two input signals applied to phase meter 35 is compared by phase meter 38 with the phase of the beat frequency between the two input signals applied to phase meter 36. In any event, the difference measurement will provide an indication representative of the location of the mobile receiver unit 13 relative to hyperbolic isophase lines having foci at the baseline stations 10 and 11. Since these isophase lines, which define a coarse lane, are spaced apart along a baseline joining the points of location of the stations 10 and 11 by a distance corresponding to one half of the wavelength of a wave having a frequency of 3.000 kc., i.e., a distance of approximately 1,640,000 feet, it will be recognized that the reading provided by such a difference measurement relates to relatively widely spaced hyperbolic lines, and, for this reason, may be termed a coarse or low phase sensitivity position indication.

The error in the position indication provided by phase meter 38 is obviously much greater than those of the phase meters 35 and 36, but the coarse phase meter reading has an error less than the width of a fine lane. As a consequence, the indication provided by the phase meter 38 is a low phase sensitivity indication which is sufficiently accurate to identify the particular pairs of fine isophase lines to which the readings on the phase meters 35 and 36 are related, thereby effecting lane identification.

Since the reference receivers 18 and 25 are both located adjacent to the baselines 10 and 11, respectively, it will be apparent that the phase meters provided at the mobile receiver unit 13 are free from third frequency error. In the event that receiver blocking problems are encountered by operation of the receivers 18 and 25 in proximity to their associated transmitters 10a and 11a, equipment may be employed of the type disclosed and claimed in copending application Serial No. 454,983, filed September 9, 1954, by Robert S. Finn and assigned to the same assignee as the present invention.

In view of the foregoing description, it will be observed that the system illustrated in Fig. 1 provides a pair of position indications of different phase sensitivity, while, at the same time, employing only a single frequency channel and utilizing a minimum amount of equipment. However, the point of location of the mobile receiver unit along the isophase line identified by the readings on the phase meters 35 and 36 cannot be determined in a two-foci system of the type illustrated in Fig. 1. To provide an absolute position determination or position fix it becomes necessary to employ at least three spaced transmitters, different pairs of which function to provide a grid-like pattern of intersecting hyperbolic lines. To this end, equipment of the type illustrated in Fig. 2 may be employed for providing information indicative of the location of any number of mobile receiver units 113 with respect to the known positions of three spaced transmitting units 110, 111 and 112. The latter transmitting units are so spaced that the baseline interconnecting the points of location of the center transmitting unit 111 and the end transmitting unit 110 is angularly disposed with respect to a similar baseline interconnecting the points of location of the center transmitting unit 111 and end transmitting unit 112. As described more fully hereinafter, each of the transmitting units 110, 111 and 112 is adapted continuously to radiate an amplitude modulated carrier wave signal. Specifically, the end transmitting unit 110 is identical to the baseline station 10 shown in Fig. 1 and described above. More particularly, the end transmitting unit 110 comprises a transmitter 110a, a receiver 118 center tuned to a frequency of 101.500 kilocycles, a 3,000 cycle band pass filter 119 and a divider circuit 120. The transmitter 110a, like the transmitter 10a previously described, consists of an oscillator or signal generator 114 for developing radio frequency signals having a frequency of 103.000 kilocycles, a modulator unit 115, which is simultaneously excited by the signal from the oscillator 114 and the audio frequency signal from the divider circuit 120, and a final amplifier 116 for amplifying the signal output of the modulator 115 and applying the same to a radiating antenna 117.

Similarly, the equipment provided at the end transmitting unit 112 comprises a transmitter 112a, a receiver 140 center tuned to a frequency of 102.375 kilocycles, a 4,750 band pass filter 141 and a divider circuit 142. The transmitter 112a consists of an oscillator or signal generator 143 developing radio frequency signals of 104.750 kilocycles, a modulator 144 excited by the signal output of the oscillator 143 and the audio frequency output of the divider circuit 142 and a final amplifier 145 for passing signals to an emitting antenna system 146.

The equipment provided at the center transmitting unit 111 comprises a transmitter 111a, a receiver 125 center tuned to a frequency of 102.500 kilocycles, a 3,000 cycle band pass filter 126, a 4,750 cycle band pass filter 127, and a pair of divider circuits 128 and 129 respectively associated with the filters 126 and 127. The transmitter 111a includes an oscillator 121 developing signals having a frequency of 100.000 kilocycles, a modulator 122, which is simultaneously excited by the signal output from the oscillator 121 and both of the audio frequency signals developed by the divider circuits 128 and 129 and a final amplifier 123 for passing signals to a radiating antenna 124.

Referring now to the operation of the three transmitters shown in Fig. 2, it will be observed that the receiver 118 at the end transmitting unit 110 functions to receive the modulated carrier waves radiated by all three of the transmitters 110a, 111a and 112a. The receiver 118 detects all of the modulation components appearing on these waves and at the same time heterodynes in pairs the received waves and their upper and lower side bands. All of the signals developed by the receiver 118, except for the 3,000 cycle beat frequency between the carrier waves radiated by transmitters 110a and 111a, are rejected by the 3,000 cycle band pass filter 119. The 3,000 cycle beat frequency signal is, of course, passed by the filter 119 to a divider circuit 120, where its frequency is divided by a factor of three to develop a 1,000 cycle audio frequency for application to the modulator 115. The latter modulator functions to amplitude modulate the signals developed by the oscillator 114 with the 1,000 cycle signal from the divider 120 and, as a result, the transmitter 110a continuously radiates a radio frequency signal amplitude modulated by a 1,000 cycle audio frequency signal.

Similarly, the receiver 140 at the end transmitting unit 112 receives all of the modulated carrier waves radiated by the transmitters 110a, 111a and 112a. The modulation components are detected and reproduced by the receiver 140 while at the same time the carrier waves and their upper and lower side bands are heterodyned in pairs to develop a large number of beat frequency signals. All of the reproduced modulation components and all of the developed beat frequency signals except for the 4,750 cycle beat frequency between the carrier waves radiated by the transmitters 111a and 112a are rejected by the band pass filter 141. The 4,750 cycle beat frequency signal is passed by the filter 141 and is applied to a divider circuit 142 where its frequency is divided by a factor of three to develop a 1,583.33 cycle audio frequency signal for application to the modulator 144. Thus, the carrier wave developed by the oscillator 143 and radiated by the transmitter 112a is continuously modulated with the audio frequency signal from the divider 142.

The receiver 125 at the center transmitting unit 111 also receives all three of the modulated carrier waves radiated by the transmitters 110a, 111a and 112a. The modulation components appearing on these three carrier waves are detected and reproduced by the receiver 125, while at the same time the three accepted carrier waves and their upper and lower side bands are heterodyned in pairs to develop a plurality of beat frequency signals for application to the signal input terminals of the band pass filters 126 and 127. The filter 126 rejects all of the signals developed by the receiver 125 except for the 3,000 cycle difference frequency between the carrier waves radiated by the transmitters 110a and 111a. The band pass filter 127, on the other hand, rejects all of the signals developed by the receiver 125 with the exception of the 4,750 cycle beat frequency between the carrier waves radiated by the transmitters 111a and 112a. The 3,000 cycle signal passed by the filter 126 is applied to the divider circuit 128, where its frequency is divided by a factor of four to develop a 750 cycle audio frequency for application to the modulator 122. In similar manner the 4,750 cycle signal passed by the filter 127 is applied to the divider circuit 129, where its frequency is also divided by four and hence is reduced to an audio frequency of 1,187.5 cycles. The signal developed by the divider circuit 129 is also applied to the modulator 122 with the result that the carrier wave developed by the oscillator 121 and radiated by the transmitter 111a is continuously amplitude modulated with a pair of low frequency signals respectively developed by the divider circuits 128 and 129.

To summarize briefly, the end transmitting unit 110 functions to radiate continuously a carrier wave of 103.000 kilocycles which is amplitude modulated by a 1,000 cycle audio frequency signal, the end transmitting unit 112 functions continuously to radiate a 104.750 kilocycle signal which is amplitude modulated with a 1,583.33 cycle signal and the center transmitting unit 111 functions continuously to radiate a 100.000 kilocycle signal which is simultaneously amplitude modulated with 750 and 1,187.5 cycle audio frequency signals.

Turning now to the operation of the equipment at the mobile receiver unit 113 to develop position indications from the signals radiated by the three described transmitting units, it will be observed that a receiver 130 accepts the modulated carrier waves radiated by all three of the transmitters 110a, 111a and 112a. The receiver 130 detects and reproduces all of the modulation components appearing upon the accepted carrier wave signals and also functions to heterodyne in pairs the carrier waves and their upper and lower side bands. All of the signals developed by the receiver 130 are simultaneously applied to the signal input terminals of a plurality of band pass filters 131, 132, 133, 138, 139 and 150 where these signals are separated and the undesired signals are rejected. Specifically, the band pass filter 131 rejects all of the signals developed by the receiver 130 except for the 3,000 cycle beat frequency between the carrier waves received from transmitters 110a and 111a, the band pass filter 138 rejects all of the developed signals except the 4,750 cycle beat frequency between the carrier waves received from the transmitters 111a and 112a, the band pass filter 133 rejects all of the developed signals except the 750 cycle signal modulated upon the carrier wave received from the transmitter 111a, the filter 132 rejects all of the signals developed by the receiver 130 except the 1,000 cycle signal modulated upon the carrier wave radiated by the transmitter 110a, the filter 139 rejects all of the developed signals except the 1,187.5 cycle signal modulated upon the carrier wave radiated by the transmitter 111a and the filter 150 rejects all of the developed signals except the 1,583.33 cycle signal modulated upon the carrier wave received from the transmitter 112a. Obviously, all of the remaining signals developed by the receiver 130 are rejected by the band pass filters and, hence, have no effect on the operation of the equipment at the mobile receiver unit. The 1,000 cycle signal passed by the filter 132 is applied to a multiplier circuit 134 where its frequency is multiplied by a factor of three to create a 3,000 cycle signal. Similarly, the 750 cycle signal passed by the filter 133 is applied to a multiplier circuit 137 where its frequency is multiplied by a factor of four to provide a 3,000 cycle signal. The 1,187.5 cycle signal passed by the filter 139 is applied to a multiplier circuit 151 where it is multiplied by a factor of four to develop a 4,750 cycle signal. Finally, the 1,583.33 cycle signal passed by the filter 150 is applied to a multiplier 152, where its frequency is multiplied by a factor of three to create a 4,750 cycle signal. The 3,000 cycle signal passed by band pass filter 131 is applied to one set of signal input terminals of a phase meter 155 and to one set of signal input terminals of a phase meter 135. A second set of signal input terminals of the latter phase meter is excited by the 3,000 cycle signal output of the multiplier 134. As will be recognized from the foregoing description, the phase meter 135 measures the phase relationship between the two signals applied to its sets of signal input terminals to provide an indication representaitve of the location of the mobile receiver unit 113 relative to hyperbolic isophase lines having foci at the end transmitting unit 110 and the center transmitting unit 111. Along a baseline connecting the units 110 and 111 the isophase lines to which the reading of the phase meter 135 pertains are spaced apart by a distance corresponding to one half wave length of a signal having a frequency of 100.000 kilocycles. At the indicated frequencies this spacing corresponds to a distance of approximately 4,880 feet with the result that the position indication provided by the phase meter 135 may be termed a fine or high phase sensitivity indication.

Similarly, the 3,000 cycle signal passed by the filter 131 to the upper set of signal input terminals of the phase meter 155 is phase compared with the 3,000 cycle signal developed by the multiplier 137 to provide an indication representative of the location of the mobile receiver unit relative to hyperbolic isophase lines having foci at the end transmitting unit 110 and at the center transmitting unit 111. Along a baseline connecting the units 110 and 111 the isophase lines to which the reading on the phase meter 155 pertains are spaced apart by a distance corresponding to one half wave length of the signal radiated from the end transmitting unit 110. At the indicated 103.000 kilocycle frequency, the spacing between the isophase lines corresponds to a distance of 4,760 feet and, accordingly, the position indication provided by the phase meter 155 may again be termed a fine, or high phase sensitivity, position indication.

In order to provide a coarse, or low phase sensitivity, position indication to resolve the ambiguity in the readings on the phase meters 135 and 155, it is necessary to measure the difference of the outputs of these two phase meters. This difference measurement may be accomplished in the manner described above, either electrically or mechanically, by means of a phase indicator 156. The mechanical difference measurement may be effected by connecting the rotor shafts driving the indicating elements 135a and 155a of the phase meters 135 and 155, respectively, to drive the input gears of a conventional differential mechanism, the output of which is connected to drive the indicating element 156a of the phase meter 156. As previously mentioned, the electrical measurement may be effected by mixing the two signals applied to the input terminals of the phase meter 135 in order to obtain a first beat frequency signal and by mixing the two signals applied to the phase meters of the input terminal 155 in order to obtain a second beat frequency signal. The phase relationship between the two beat frequencies may then be measured in conventional manner by the phase meter 156. In any event, the difference measurement provides an indication representative of the location of the mobile receiver unit 113 relative to hyperbolic isophase lines having foci at the baseline transmitting units 110 and 111. Since these isophase lines, which define a coarse lane, are spaced apart along a baseline joining the points of location of the units 110 and 111 by a distance corresponding to one half of the wave length of a signal having a frequency of 3.000 kilocycles, i.e., a distance of approximately 1,640,000 feet, it will be recognized that the reading provided by the phase meter 156 relates to relatively widely spaced hyperbolic lines and, for this reason, may be termed a coarse, or low phase sensitivity, position indication.

To provide another fine position indication, the 4,750 cycle signal passed by the filter 138 is applied to a first set of signal input terminals of a fine phase meter 153, the second set of signal input terminals of which is excited by the 4,750 cycle signal output from the multiplier 152. In view of the foregoing description, it will be apparent that the phase meter 153 measures the phase relationship between the two signals applied to its separate sets of signal input terminals and provides an indication of the location of the mobile receiver unit 113 relative to hyperbolic isophase lines having foci at the center transmitting unit 111 and the end transmitting unit 112. Again, the isophase lines to which the reading on the phase meter 153 relates are separated along a baseline interconnecting the units 111 and 112 by a distance corresponding to one half wave length of the carrier wave radiated by the center transmitting unit 111 which has a frequency of 100.000 kilocycles. At the indicated frequency this spacing corresponds to a distance of approximately 4,880 feet. Thus, the indication provided by the phase meter 153 may be termed a fine or high phase sensitivity indication, since it relates to isophase lines spaced relatively close together.

In similar manner the 4,750 cycle signal passed by the filter 138 is applied to one set of signal input terminals of phase meter 154, while the second set of signal input terminals of this meter is excited by the 4,750 cycle signals developed by the multiplier 151. The phase meter 154, of course, measures the phase relationship between the two signals applied to its separate sets of signal input terminals and provides an indication of the location of the mobile receiving unit relative to hyperbolic isophase lines having foci at the center transmitting unit 111 and the end transmitting unit 112. Again, the isophase lines to which the reading on the phase meter 154 relates are separated along a baseline connecting the units 111 and 112 by a distance corresponding to one half wave length of the carrier wave radiated by the end transmitting unit 112. At the indicated 104.750 kilocycle frequency, the isophase lines are separated by a distance of approximately 4,697 feet and, accordingly, the indication provided by the phase meter 154 may also be termed a fine, or high phase sensitivity, indication.

In order to provide a second coarse, or low phase sensitivity, position indication, the difference between the outputs of the two phase meters 153 and 154 may be measured either mechanically or electrically in the manner described above. Such a difference measurement, which is effected by phase meter 157, provides an indication representative of the location of the mobile receiver unit 113 relative to hyperbolic isophase lines having foci at the baseline stations 111 and 112. These isophase lines, which again define a coarse lane, are spaced apart along a baseline joining the points of location of the units 111 and 112 by a distance corresponding to one half of the wave length of a wave having a frequency of 4,750 cycles, i.e., a distance of approximately 1,035,789 feet. It will, therefore, be recognized that the reading provided by the phase meter 157 relates to relatively widely spaced hyperbolic lines and, for this reason, may be termed a coarse, or low phase sensitivity, position indication.

In view of the foregoing description, it will be observed that the indications provided by the phase meters 135 and 153 and the phase meters 154 and 155 identify pairs of hyperbolic isophase lines intersecting at the location of the mobile receiver unit 113 and effecting a position fix. However, as indicated above, the readings appearing upon these phase meters are ambiguous in the sense that no lane identification is effected. This ambiguity is, of course, resolved by the coarse position indications provided by the phase meters 156 and 157.

While the error in the position indications provided by the latter coarse phase meters is obviously much greater than the error in the fine position indications provided by the phase meters 135, 153, 154 and 155, the coarse indications are, nevertheless, sufficiently accurate to identify the particular lane to which the fine phase meter readings pertain. Accordingly, the coarse phase meter readings function to identify a pair of intersecting isophase lines having an accuracy sufficient to resolve the ambiguity in the fine phase meter readings.

It will be observed that, in the system shown in Fig. 2, an absolute position determination which is free from ambiguity is effected by means of a transmitting and receiving system employing a single frequency channel. Moreover, a single receiver is employed at the mobile receiver unit and a single receiver and transmitter are used at each of the transmitting units, thereby effecting an economy of equipment employed.

While particular embodiments of the invention have been shown, it will be understood, of course, that the invention is not limited thereto, since many modifications may be made, and it is therefore contemplated by the appended claims to cover any such modifications as fall within the true spirit and scope of the invention.

What is claimed as new and desired to be secured by Letters Patent of the United States is:

1. A radio position finding system of the three foci, hyperbolic type comprising a center transmitting station radiating a first position indicating signal; first and second end transmitting stations each spaced from said center transmitting station and respectively radiating second and third position indicating signals; said first, second and third position indicating signals being different from each other in frequency but all falling within a single ten kilocycle frequency channel; means at said first end station for heterodyning said first and second signals to develop a first beat frequency signal; a frequency divider at the first end station for dividing said first beat signal by a first integer in order to develop a first reference signal; means for modulating said second position indicating signal with said first reference signal; means at said second end station for heterodyning said first and third position indicating signals to develop a second beat signal; a frequency divider at the second end station for dividing said second beat signal by a second integer in order to develop a second reference signal; means for modulating said third position indicating signal with said second reference signal; means at the center station for heterodyning said first and second signals to develop a third beat signal and for heterodyning said first and third signals to develop a fourth beat signal; frequency dividing means at the center station for respectively dividing the third and fourth beat signals by third and fourth integers differing from said first and second integers in order to develop third and fourth reference signals; means at the center station for modulating said third and fourth reference signals upon said first position indicating signal; and a mobile receiving unit including means for reproducing all four of the reference signals, for heterodyning the first and third position indicating signals to develop a fifth beat signal, and for heterodyning the first and second position indicating signals to develop a sixth beat signal, said mobile receiving unit further including means for multiplying the frequency of the first reproduced reference signal by an integer equal to said first integer to develop a first multiplication signal means for comparing the first multiplication signal with said fifth beat signal to provide a first fine position indication accurately representative of the location of the mobile receiving unit relative to said center station and said first end station, means for multiplying the frequency of said second reproduced reference signal by an integer equal to said second integer to develop a second multiplication signal, means for comparing the second multiplication signal with said sixth beat signal to provide a second fine position indication accurately representative of the position of said mobile receiving unit relative to said center station and said second end station, means for multiplying the third and fourth reproduced reference signals by integers respectively equal to the third and fourth integers to develop third and fourth multiplication signals, means jointly responsive at least in part to the first and third multiplication signals for providing a first coarse position indication representative of the approximate location of said mobile receiving unit relative to said center station and said first end station, and means jointly responsive at least in part to said second and fourth multiplication signals for providing a second coarse position indication representative of the approximate location of said mobile receiving unit relative to said center station and said second end station.

2. The structure defined by claim 1 wherein the first and second integers are equal to each other and wherein the third and fourth integers are also equal to each other but differ from the first and second integers.

3. A transmitting system for use in radio position finding equipment of the three foci, hyperbolic type, said transmitting system comprising a center transmitting station radiating a first position indicating signal; first and second end transmitting stations each spaced from said center transmitting station and respectively radiating second and third position indicating signals; said first, second and third position indicating signals being different from each other in frequency but all falling within a single ten kilocycle frequency channel; means at said first end station for heterodyning said first and second signals to develop a first beat frequency signal; a frequency divider at the first end station for dividing said first beat signal by a first integer in order to develop a first reference signal; means for modulating said second position indicating signal with said first reference signal; means at said second end station for heterodyning said first and third position indicating signals to develop a second beat signal; a frequency divider at the second end station for dividing said second beat signal by a second integer in order to develop a second reference signal; means for modulating said third position indicating signal with said second reference signal; means at the center station for heterodyning said first and second signals to develop a third beat signal and for heterodyning said first and third signals to develop a fourth beat signal; frequency dividing means as the center station for respectively dividing the third and fourth beat signals by third and fourth integers differing from said first and second integers in order to develop third and fourth reference signals, and means at the center station for modulating said third and fourth reference signals upon said first position indicating signal.

4. The structure defined by claim 3 wherein the first and second integers are equal to each other and wherein the third and fourth integers are also equal to each other but differ from the first and second integers.

5. A radio position finding system of the three foci, hyperbolic type comprising a center transmitting station radiating a first position indicating signal; first and second end transmitting stations each spaced from said center transmitting station and respectively radiating second and third position indicating signals; said first, second and third position indicating signals being different from each other in frequency but all falling within a single ten kilocycle frequency channel; means at said first end station for heterodyning said first and second signals to develop a first beat frequency signal; a frequency divider at the first end station for dividing said first beat signal by a first integer in order to develop a first reference signal; means for modulating said second position indicating signal with said first reference signal; means at said second end station for heterodyning said first and third position indicating signals to develop a second beat signal; a frequency divider at the second end station for dividing said second beat signal by a second integer in order to develop a second reference signal; means for modulating said third position indicating signal with said second reference signal; means at the center station for heterodyning said first and second signals to develop a third beat signal and for heterodyning said first and third signals to develop a fourth beat signal; frequency dividing means at the center station for respectively dividing the third and fourth beat signals by third and fourth integers differing from said first and second integers in order to develop third and fourth reference signals, means at the center station for modulating said third and fourth reference signals upon said first position indicating signal; and a mobile receiving unit including means for reproducing all four of the reference signals, for heterodyning the first and third position indicating signals to develop a fifth beat signal, and for heterodyning the first and second position indicating signals to develop a sixth beat signal, said mobile receiving unit further including means jointly responsive to the fifth beat signal and to one of the reproduced reference signals for providing a first fine position indication accurately representative of the location of the mobile receiving unit relative to said center station and said first end station, means jointly responsive to the sixth beat signal and another of the reproduced reference signals for providing a second fine position indication accurately representative of the position of said mobile receiving unit relative to said center station and said second end station, means jointly responsive at least in part to all four of the reproduced signals for providing first coarse position indications respectively representative of the approximate location of said mobile receiving unit relative to said center station and said first end station and a second coarse position indication representative of the approximate location of said mobile receiving unit relative to said center station and said second end station.

6. The apparatus defined by claim 5 wherein the first and second integers are equal to each other and wherein the third and fourth integers are also equal to each other but differ from the first and second integers.

7. In a radio position finding system of the hyperbolic continuous wave type for locating the position of a mobile receiving point, the combination of first and second spaced apart transmitting stations respectively radiating first and second position indicating signals having different frequencies falling within a single ten kilocycle frequency channel, means at the first station for heterodyning said position indicating signals to develop a first beat signal, means at said one station for dividing said beat signal by a first integer to develop a first reference signal and for modulating the first reference signal upon the first position indicating signal, means at the second station for receiving the modulated signal from said first station and for heterodyning the first position indicating signal with the second position indicating signal to develop a second beat signal, means for dividing the frequency of said second beat signal by a second integer different from the first integer to develop a second reference signal, means for modulating the second position indicating signal with said second reference signal, means at said receiving point for heterodyning said position indicating signals to produce the beat frequency therebetween and for detecting both of the reference signals modulated upon said position indicating signals, means at the receiving point for multiplying the first and second reproduced signals by integers respectively equal to the first and second integers in order to develop first and second multiplication signals, means for comparing the phase of said beat frequency with one of said multiplication signals to provide a fine indication representative of the location of said mobile receiving point relative to said transmitting stations, and means jointly responsive at least in part to both of said multiplication signals for producing a coarse position indication representative of the location of said receiving point relative to said transmitting stations.

8. In a radio position finding system of the hyperbolic continuous wave type for locating the position of a mobile receiving point, the combination of first and second spaced apart transmitting stations respectively radiating first and second position indicating signals having different frequencies falling within a single ten kilocycle frequency channel, means at the first station for heterodyning said position indicating signals to develop a first beat signal, means at said first station for dividing said beat signal by a first integer to develop a first reference signal and for modulating the first reference signal upon the first position indicating signal, means at the second station for receiving the modulated signal from said first station and for heterodyning the first position indicating signal with the second position indicating signal to develop a second beat signal, means for dividing the frequency of said second beat signal by a second integer different from the first integer to develop a second reference signal, means for modulating the second position indicating signal with said second reference signal means at said receiving point for heterodyning said position indicating signals to produce the beat frequency therebetween and for detecting both of the reference signals modulated upon said position indicating signals, means jointly responsive at least in part to the reproduced reference signals for producing a coarse position indication representative of the approximate location of said receiving point relative to said transmitting stations, and means jointly responsive to said beat frequency and to one of the reproduced reference signals for producing a fine indication representative of the location of said mobile receiving point relative to said transmitting stations.

9. In a transmitting apparatus for use in radio position finding systems of the hyperbolic continuous wave type for locating the position of a mobile receiving point, the combination of first and second spaced apart transmitting stations respectively radiating first and second position indicating signals having different frequencies falling within a single ten kilocycle frequency channel, means at the first station for heterodyning said position indicating signals to develop a first beat signal, means at said first station for dividing said beat signal by a first integer to develop a first reference signal and for modulating the first reference signal upon the first position indicating signal, means at the second station for receiving the modulated signal from said first station and for heterodyning the first position indicating signal with the second position indicating signal to develop a second beat signal, means for dividing the frequency of said second beat signal by a second integer different from the first integer to develop a second reference signal, and means for modulating the second position indicating signal with said second reference signal.

10. In a radio position finding system of the hyperbolic continuous wave type for locating the position of a mobile receiving point, the combination of first and second spaced apart transmitting stations respectively radiating first and second position indicating signals having different frequencies, means at the first station for heterodyning said position indicating signals to develop a first beat signal, means at said first station for dividing said beat signal by a first integer to develop a first reference signal, means for modulating the first reference signal upon the first position indicating signal, means at the second station for receiving the modulated signal from said one station and for developing a second reference signal differing in frequency from the first reference signal, means for modulating the second position indicating signal with said second reference signal, means at said receiving point for heterodyning said position indicating signals to produce the beat frequency therebetween and for detecting both of the reference signals modulated upon said position indicating signals, means at the receiving point for altering the frequencies of both of the reproduced reference signals to produce resulting signals of equal frequency, means jointly responsive at least in part to both of the resulting signals for producing a coarse position indication representative of the location of said receiving point relative to said transmitting stations, and means jointly responsive to said beat frequency and to one of said resulting signals for producing a fine indication representative of the location of said mobile receiving point relative to said transmitting stations.

11. In a radio position finding system of the hyperbolic continuous wave type for locating the position of a mobile receiving point, the combination of first and second spaced apart transmitting stations respectively radiating first and second position indicating signals having different frequencies, means at the first station for heterodyning said position indicating signals to develop a first beat signal, means at said first station for dividing said beat signal by an integer to develop a first reference signal, means for modulating the first reference signal upon the first position indicating signal, means at the second station for receiving the modulated signal from said first station and for developing a second reference signal differing in frequency from the first reference signal, means for modulating the second position indicating signal with said second reference signal, means at said receiving point for heterodyning said position indicating signals to produce the beat frequency therebetween and for detectng both of the reference signals modulated upon said position indicating signals, means jointly responsive at least in part to the reproduced reference signals for producing a coarse position indication representative of the location of said receiving point relative to said transmitting stations, and means jointly responsive to said beat frequency and to one of the reproduced reference signals for producing a fine indication representative of the location of said moblie receiving point relative to said transmitting stations.

12. In a transmitting apparatus for use in a radio position finding system of the hyperbolic continuous wave type for locating the position of a mobile receiving point, the combination of first and second spaced apart transmitting stations respectively radiating first and second position indicating signals having different frequencies, means at the first station for heterodyning said position indicating signals to develop a first beat signal, means at said first station for dividing said beat signal by an integer to develop a first reference signal, means for modulating the first reference signal upon the first position indicating signal, means at the second station for receiving the modulated signal from said first station, means at said second station responsive at least in part to the signal received from the first station for developing a second reference signal differing in frequency from the first reference signal, and means for modulating the second position indicating signal with said second reference signal.

13. A radio position finding system of the three foci, hyperbolic type comprising a center transmitting station radiating a first position indicating signal; first and second end transmitting stations each spaced from said center transmitting station and respectively radiating second and third position indicating signals; said first, second and third position indicating signals being different from each other in frequency; means at said first end station for heterodyning said first and second signals to develop a first beat frequency signal; a frequency divider at the first end station for dividing said first beat signal by a first integer in order to develop a first reference signal; means for modulating said second position indicating signal with said first reference signal; means at said second end station for heterodyning said first and third position indicating signals to develop a second beat signal; a frequency divider at the second end station for dividing said second beat signal by a second integer in order to develop a second reference signal; means for modulating said third position indicating signal with said second reference signal; means at the center station for receiving the modulated signals from both of said end stations and for developing third and fourth reference signals differing in frequency from each other and from both of said first and second reference signals; means at the center station for modulating said third and fourth reference signals upon said first position indicating signal; and a mobile receiving unit including means for reproducing all four of the reference signals, for heterodyning the first and third position indicating signals to develop a fifth beat signal, and for heterodyning the first and second position indicating signals to develop a sixth beat signal, said mobile receiving unit further including means for multiplying the frequency of the first reproduced reference signal by an integer equal to said first integer to develop a first resulting signal, means for comparing the first resulting signal with said fifth beat signal to provide a first time position indication accurately representative of the location of the mobile receiving unit relative to said center station and said first end station, means for multiplying the frequency of said second reproduced reference signal by an integer equal to said second integer to develop a second resulting signal, means for comparing the second resulting signal with said fourth beat signal to provide a second fine position indication accurately representative of the position of said mobile receiving unit relative to said center station and said second end station, means for altering the frequencies of the third and fourth reproduced reference signals to develop third and fourth resulting signals respectively equal to the first and second resulting signals, means jointly responsive at least in part to the first and third resulting signals for providing a first coarse position indication representative of the approximate location of said mobile receiving unit relative to said center station and said first end station, and means jointly responsive at least in part to said second and fourth multiplication signals for providing a second coarse position indication representative of the approximate location of said mobile receiving unit relative to said center station and said second end station.

14. A transmitting system of the three foci, hyperbolic type comprising a center transmitting station radiating a first position indicating signal, first and second end transmitting stations each spaced from said center transmitting station and respectively radiating second and third position indicating signals; said first, second and third position indicating signals being different from each other in frequency; means at said first end station for heterodyning said first and second signals to develop a first beat frequency signal; a frequency divider at the first end station for dividing said first beat signal by a first integer in order to develop a first reference signal; means for modulating said second position indicating signal with said first reference signal; means at said second end station for heterodyning said first and third position indicating signals to develop a second beat signal; a frequency divider at the second end station for dividing said second beat signal by a second integer in order to develop a second reference signal; means for modulating said third position indicating signal with said second reference signal; means at the center station for receiving the modulated signals from both of said end stations and for developing third and fourth reference signals differing in frequency from each other and from both of said first and second reference signals, and means at the center station for modulating said third and fourth reference signals upon said first position indicating signal.

15. A radio position finding system of the three foci, hyperbolic type comprising a center transmitting station radiating a first position indicating signal, first and second end transmitting stations each spaced from said center transmitting station and respectively radiating second and third position indicating signals; said first, second and third position indicating signals being different from each other in frequency; means at said first end station for heterodyning said first and second signals to develop a first beat frequency signal; a frequency divider at the first end station for dividing said first beat signal by a first integer in order to develop a first reference signal; means for modulating said second position indicating signal with said first reference signal; means at said second end station for heterodyning said first and third position indicating signals to develop a second beat signal; a frequency divider at the second end station for dividing said second beat signal by a second integer in order to develop a second reference signal; means for modulating said third position indicating signal with said second reference signal; means at the center station for receiving the modulated signals from both of said end stations and for developing third and fourth reference signals differing in frequency from each other and from said first and second reference signals, means at the center station for modulating said third and fourth reference signals upon said first position indicating signal; and a mobile receiving unit including means for reproducing all four of the reference signals, for heterodyning the first and third position indicating signals to develop a fifth beat signal, and for heterodyning the first and second position indicating signals to develop a sixth beat signal, said mobile receiving unit further including means jointly responsive to one of said first and second reproduced reference signals and to said fifth beat signal for providing a first fine position indication accurately representative of the location of the mobile receiving unit relative to said center station and said first end station, means jointly responsive to one of the third and fourth reproduced reference signals and to said sixth beat signal to provide a second fine position indication accurately representative of the position of said mobile receiving unit relative to said center station and said second end station, means jointly responsive at least in part to the first and third reproduced reference signals for providing a first coarse position indication representative of the approximate location of said mobile receiving unit relative to said center station and said first end station, and means jointly responsive at least in part to the second and fourth reproduced reference signals for providing a second coarse position indication representative of the approximate location of said mobile receiving unit relative to said center station and said second end station.

References Cited in the file of this patent

UNITED STATES PATENTS

| | | |
|---|---|---|
| 2,513,315 | Hawkins | July 4, 1950 |
| 2,598,290 | O'Brien | May 27, 1952 |
| 2,611,127 | Palmer | Sept. 16, 1952 |
| 2,652,558 | Hawkins | Sept. 15, 1953 |
| 2,652,559 | Hawkins | Sept. 15, 1953 |
| 2,730,714 | Mahoney | Jan. 10, 1956 |

UNITED STATES PATENT OFFICE
CERTIFICATE OF CORRECTION

Patent No. 2,974,318                              March 7, 1961

Beverly W. Koeppel

It is hereby certified that error appears in the above numbered patent requiring correction and that the said Letters Patent should read as corrected below.

Column 2, line 35, for "another object of the present invention" read -- an object of the invention, therefore, --; line 41, for "objects" read -- object --; column 11, line 74, for "as" read -- at --; column 13, line 43, strike out "said"; column 14, line 58, for "detectng" read -- detecting --.

Signed and sealed this 12th day of September 1961.

(SEAL)
Attest:

ERNEST W. SWIDER
Attesting Officer

DAVID L. LADD
Commissioner of Patents

USCOMM-DC